(12) United States Patent
Konno

(10) Patent No.: US 7,476,169 B2
(45) Date of Patent: Jan. 13, 2009

(54) GUIDE FOR TRANSMISSION DEVICE

(75) Inventor: Masahiko Konno, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 298 days.

(21) Appl. No.: 11/303,697

(22) Filed: Dec. 16, 2005

(65) Prior Publication Data
US 2006/0172835 A1    Aug. 3, 2006

(30) Foreign Application Priority Data
Jan. 19, 2005    (JP) .............................. 2005-011608

(51) Int. Cl.
F16H 7/18    (2006.01)
(52) U.S. Cl. ...................... 474/140; 474/111
(58) Field of Classification Search ................. 474/111, 474/140, 101, 144, 145, 146
See application file for complete search history.

(56) References Cited

U.S. PATENT DOCUMENTS

| | | | | |
|---|---|---|---|---|
| 4,826,468 | A | * | 5/1989 | Friedrichs .................... 474/101 |
| 5,045,032 | A | * | 9/1991 | Suzuki et al. ............... 474/140 |
| 5,184,983 | A | * | 2/1993 | Shimaya et al. ............. 474/111 |
| 6,890,277 | B2 | | 5/2005 | Inoue et al. |
| 2003/0040385 | A1 | * | 2/2003 | Konno ......................... 474/111 |
| 2003/0139237 | A1 | | 7/2003 | Konno et al. |
| 2004/0058762 | A1 | | 3/2004 | Konno |
| 2004/0058763 | A1 | | 3/2004 | Konno |
| 2005/0096167 | A1 | | 5/2005 | Konno |
| 2005/0107196 | A1 | | 5/2005 | Konno |
| 2005/0200044 | A1 | | 9/2005 | Konno |
| 2006/0172836 | A1 | | 8/2006 | Mori et al. |

FOREIGN PATENT DOCUMENTS

| | | | |
|---|---|---|---|
| EP | 1 528 288 A1 | | 5/2005 |
| GB | 2 408 308 A | | 5/2005 |
| JP | 08-200458 | | 8/1996 |
| JP | 2000-097300 | * | 4/2000 |
| JP | 2002-098203 | | 4/2002 |
| JP | 2004-116680 | | 4/2004 |

* cited by examiner

Primary Examiner—Robert A Siconolfi
Assistant Examiner—Vu Q Nguyen
(74) Attorney, Agent, or Firm—Howson & Howson LLP

(57) ABSTRACT

A guide for an engine timing chain comprises a metal supporting base and a resin shoe, the shoe having integrally formed hooks for attachment to the supporting base, and integrally formed side walls for limiting lateral movement of the chain on the sliding contact surface of the shoe. A central portion of the shoe has a sandwich injection molded structure and comprises a high strength core of glass fiber-reinforced polyamide resin, and a polyamide skin layer. The side walls and the hooks are formed entirely of the skin layer material.

2 Claims, 6 Drawing Sheets

GUIDE FOR TRANSMISSION DEVICE

CROSS REFERENCE TO RELATED APPLICATION

This application claims priority on the basis of Japanese patent application 2005-011608, the disclosure of which is hereby incorporated by reference.

FIELD OF THE INVENTION

The invention relates to improvements in a sliding contact guide for an endless, flexible, traveling transmission medium, such as a timing chain for transmitting power from a crankshaft sprocket to one or more camshaft sprockets in an internal combustion engine. The invention is applicable to fixed guides, as well as to movable guides which cooperate with a tensioner to control tension in a transmission medium.

BACKGROUND OF THE INVENTION

Japanese Patent Publication No. 3448122 describes a guide of the type to which this invention relates. More particularly, it describes a guide in the form of a tensioner lever composed of a polyamide resin shoe attached to a support base composed of die cast aluminum or glass fiber-reinforced polyamide resin.

In internal combustion engine design, in order to achieve increased engine power output or torque, the engine displacement is often increased by increasing the piston and cylinder diameters, or by increasing the piston stroke. However, the external dimensions of the engine often remain unchanged. Thus, although the load imparted to the tensioner lever is increased as a result of the increase in the engine displacement, there is no concomitant increase in the size or strength of the tensioner lever. The useful life of the tensioner lever is therefore shortened.

The strength of a tensioner lever can be increased by increasing the thickness of its shoe support base. However, in most cases, because of limitations in the space available for the tensioner lever and adjacent engine parts, it is difficult to increase the thickness of the lever's shoe support base.

The strength of the shoe support base can be increased, without changing its size and shape, by forming the base from a different material such as a high strength steel. However the adoption of a higher strength material for the shoe support base results in higher manufacturing costs both because of the increased cost of material, and because of the increased difficulty of molding the higher strength material.

It is possible to address the problem of achieving adequate strength in a tensioner lever for an increased displacement engine, without changing the shape of the shoe support base, by molding the shoe from a high strength resin. Such an approach is illustrated in FIG. 6. The external shape and dimensions of the shoe support base 520 remain unchanged. However, the cost of the tensioner lever 500 is increased because of the high cost of the material of the shoe 510. Moreover, the hooks provided on the shoe for connecting the shoe to the shoe support 520 become less flexible with the adoption of the higher strength shoe material. The side walls, which extend outward from the chain-contacting surface of the shoe to limit lateral movement of the chain, also become less flexible, and impair the overall flexibility of the shoe. Consequently, assembly of the tensioner lever becomes more difficult, and cracks, splits, fissures and the like can form in the shoe, making failure due to shoe breakage more likely.

An object of the invention is to provide a guide which exhibits adequate strength for use with an engine having increased displacement, without changing its external shape or dimensions, without increasing its weight and production cost, without making assembly more difficult, and without impairing the longevity of the guide.

The guide in accordance with the invention comprises a shoe-supporting base adapted for mounting on an engine block and an elongated shoe having a sliding contact surface for sliding engagement with an endless, traveling transmission chain. The shoe is connected to, and supported by, the shoe-supporting base, and has at least one side wall extending from its sliding contact surface in a direction such that it can engage a side of a chain traveling on the sliding contact surface and thereby limit snaking travel of the chain. The shoe also has at least one hook securing the shoe to the shoe-supporting base. The guide is characterized by the fact that the shoe is a sandwich-molded resin structure, having an internal core and a skin layer, the internal core being composed of a resin having a higher strength than the resin of the skin layer, and by the fact that the side wall and hook are both unitary with the skin layer.

Preferably, the skin layer is composed of a polyamide resin, and the core is composed of a glass fiber-reinforced polyamide resin.

The invention makes it possible for a high strength shoe to be molded reliably with highly accurate outer dimensions. A guide incorporating the shoe exhibits high strength over a long period of time, and can used in an engine having increased displacement, without changing its shape or dimensions, and without increasing its weight or significantly increasing its manufacturing cost. Furthermore, the side wall (or side walls) of the shoe, and the hooks which connect the shoe to the supporting base, all of which are flexed temporarily when the shoe is incorporated onto the supporting base, remain highly flexible, and therefore allow the shoe to be incorporated onto the supporting base without difficulty.

When glass fiber-reinforced polyamide resin is used as the core of the shoe, the strength of the guide is remarkably improved, and the shoe is able to withstand the high loads imposed as a result of increased engine displacement. The polyamide resin forming the skin layer envelops the glass fiber-reinforced core completely, ensures that the guide will retain its shape, and exposes a surface on which the timing chain can slide with low friction, and with minimal wear.

DETAILED DESCRIPTION OF THE PREFERRED EMBODIMENTS

The guide according to the invention will be described with reference to a movable guide, which cooperates with a tensioner to control tension in a timing chain.

Figure 1:
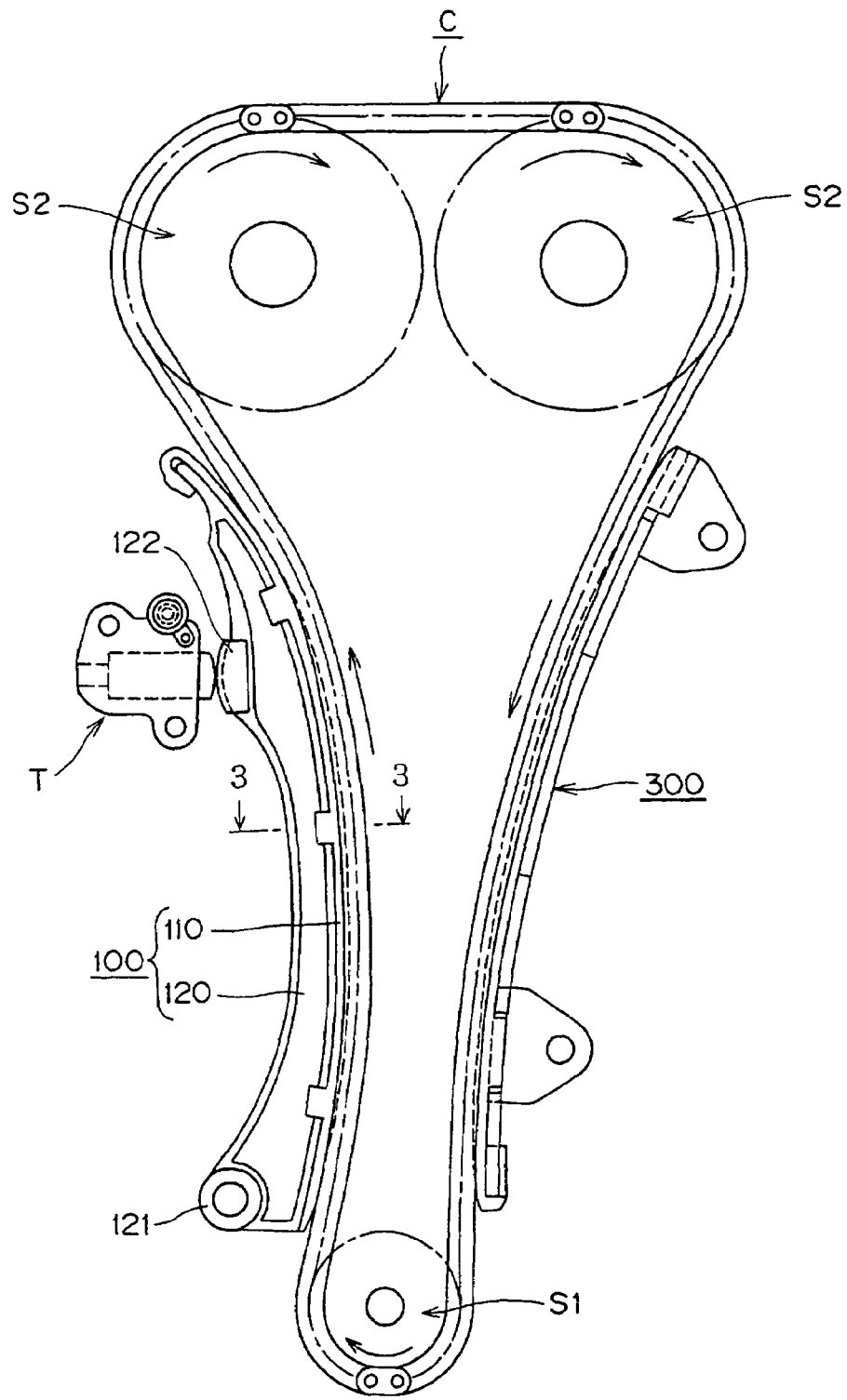
FIG. 1 is a schematic diagram of a timing transmission of an internal combustion engine, incorporating fixed and movable guides in accordance with the invention.

As shown in FIG. 1, the guide 100 is used in the valve timing system of an internal combustion engine, in which an endless, flexible, timing chain C is driven by a crankshaft sprocket S1, and drives a pair camshaft sprockets S2. The chain is in sliding contact with the shoe 110 of a movable guide 100.

Figure 2:
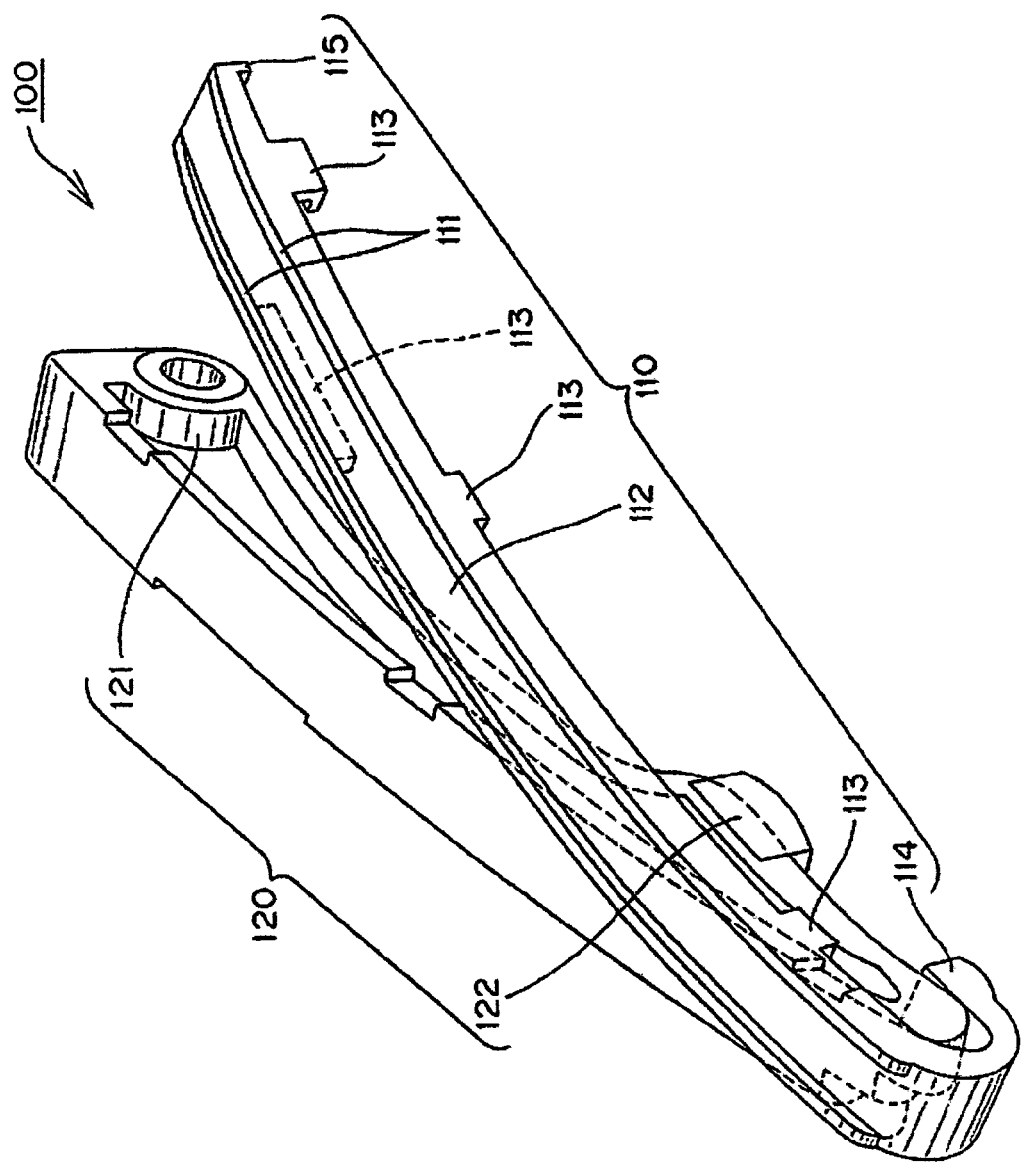
FIG. 2 is a perspective view illustrating the assembly of a movable guide according to the invention.

As shown in FIGS. 1 and 2, the shoe 110 has a substantially arc-shaped surface for sliding contact with the timing chain C, and is held by a supporting base 120 disposed on the back side of the shoe, i.e., the side opposite from the side which is in sliding contact with the chain. A boss 121, having a mounting hole, is provided at one end of the supporting base for receiving a pin or shaft (not shown) on which the guide is pivoted, the pin or shaft being fixed to an engine block. A pad 122 on the back side of the supporting base is engaged by the plunger of a tensioner T, which applies proper tension to the chain C, through the pivoted guide 100, in order to prevent excessive tension in, and excessive loosening of, the chain.

As shown in FIG. 2, the shoe 110 includes side walls 111, which prevent snaking of the timing chain. The side walls 111 extend outward from the longitudinal side edges of a central part 112 of the shoe, which is adapted for sliding contact with the transmission chain. Hooks 113 are provided on both sides of the shoe for engagement with the supporting base 120, which has notches into which leg portions of the hooks fit. A hook-shaped engagement portion 114, is formed on one end of the shoe for engagement with the end of the supporting base 120 remote from the boss 121, on which the guide is pivoted. A protrusion 115 is formed at the opposite end of the shoe, for engagement with the end of the supporting base adjacent the pivot location.

In the assembly of the guide, the hook-shaped engagement portion 114 is first fitted onto the end of the supporting base remote from the pivot location. Then the hooks 113, which are preferably disposed in a staggered configuration along the length of the shoe on both sides thereof, are sequentially engaged with the supporting base by flexing the shoe, until the protrusion 115 is engaged with the end of the supporting base adjacent the pivot location.

Figure 3:
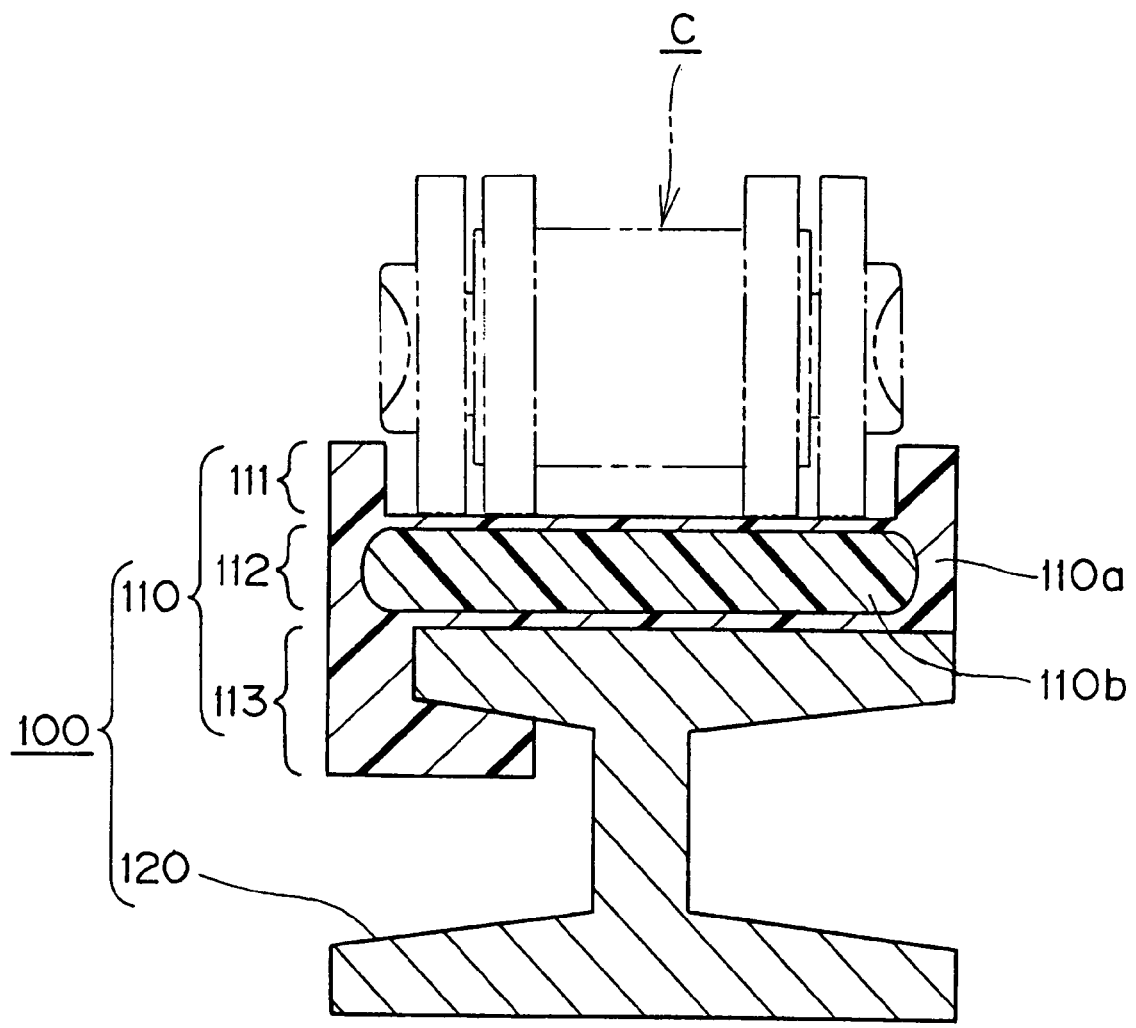
FIG. 3 is a cross-sectional view taken on plane 3-3 of FIG. 1.

As shown in FIG. 3, the shoe 110 consists of two integrally fused layers, one being a skin layer 110a, and the other being a core layer 110b. The skin layer entirely covers the entire surface of the core layer. The integrally fused core and skin layers can be, and preferably are, produced by sandwich injection molding.

The side walls 111 and the hooks 113 are composed entirely of the material of the skin layer, and are unitary parts of the skin layer 110a. The sliding contact surface, on the central part 112 of the shoe, is also composed entirely of skin layer material and is a unitary part of the skin layer 110a. Thus, in the preferred embodiment, the side walls 111, the hooks 113 and the sliding contact surface are composed entirely of the polyamide resin of the skin layer 110a, while the central part 112 is composed of a glass-reinforced polyamide resin core layer 110b enveloped by the polyamide resin skin layer 110a. The polyamide resin of the skin layer 110a and the glass-reinforced polyamide resin of the core layer 110b are fused together in the sandwich injection molding process.

Since the strength of the shoe 110 is improved by virtue of its sandwich structure and the use of a glass fiber-reinforced resin as the core layer. 110b, the guide can be used in an engine having a high engine displacement without increasing the size of the supporting base or the shoe. Further, since the shoe can be accurately and reliably molded with the same shape and dimensions as a conventional shoe, the same mold as used to mold the conventional shoe can be used to sandwich-mold the improved shoe. Moreover, since the skin layer 110a and the core layer 110b are molded simultaneously by sandwich injection molding, the molding cost is not significantly increased. Additionally, since the skin layer 110a and the core layer 110b are fused together the strength of the shoe is higher than the strength of a composite shoe in which the layers are produced by deposition secured together by adhesive.

Since the side walls 111 and the hooks 113 do not have a high strength core, their flexibility is maintained, and the shoe can be incorporated onto the support base easily, by temporary twisting, without the generation of cracks, splits, fissures or the like, which can result in breakage of the guide. Furthermore, a convention shoe composed entirely of non-reinforced polyamide resin exhibits a large thermal shrinkage, and consequently an excess area for engagement with the support base must be provided. However, glass-reinforced resin has a relatively small thermal shrinkage. Therefore, when a core layer composed of glass-reinforced resin is provided in the shoe, the excess area needed in order to accommodate thermal shrinkage can be significantly decreased, providing greater freedom of design.

In summary, according to the invention, a guide having adequate strength and durability for use with an engine having a higher output, can be achieved without increasing the size and weight of the guide, without significantly increasing its cost of production, and without making it more difficult to assemble.

Figure 4:
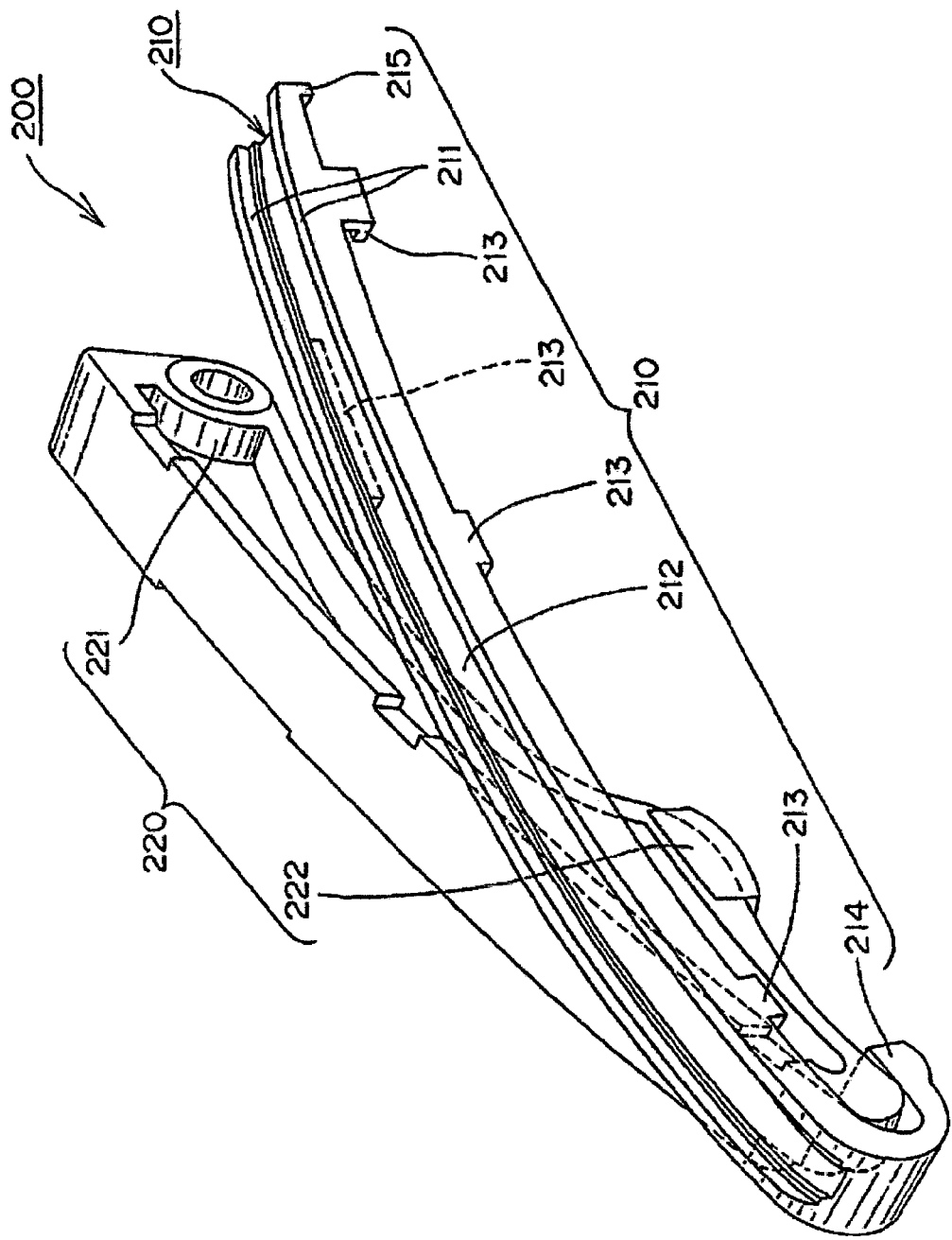
FIG. 4 is a perspective view illustrating a modified guide according to the invention.
Figure 5:
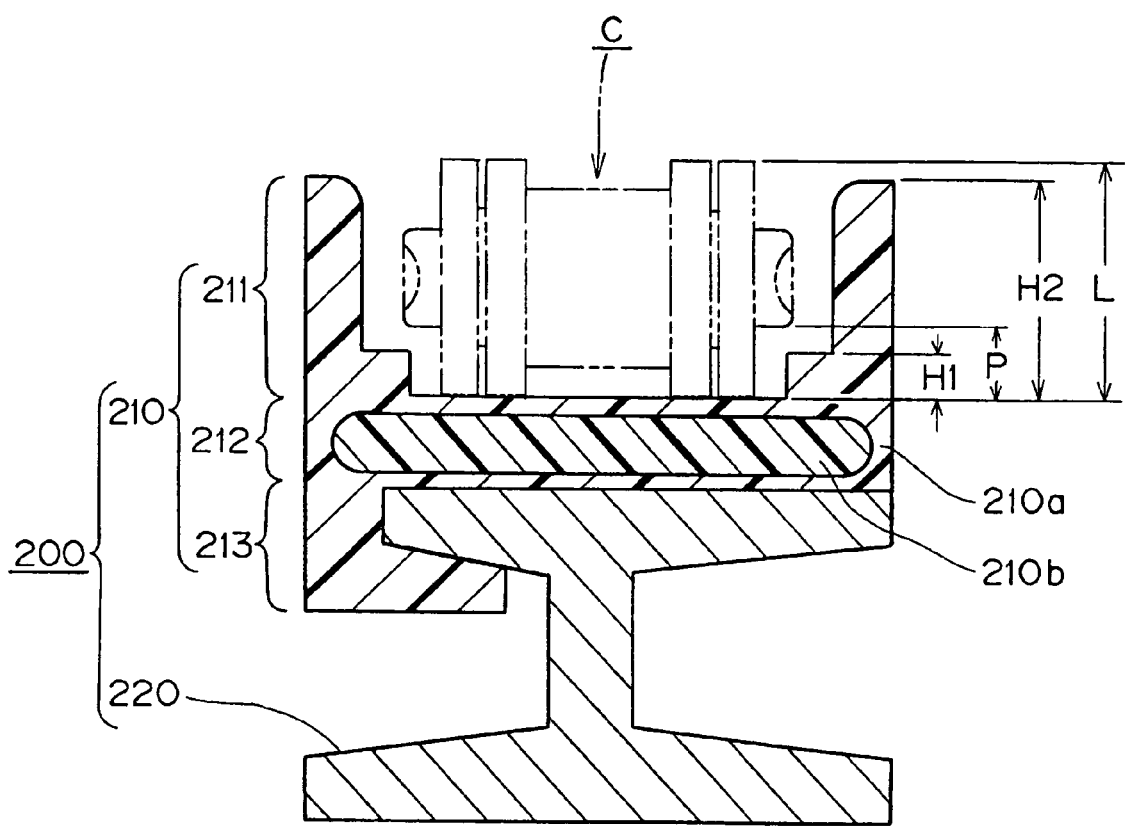
FIG. 5 is a cross-sectional view of the guide shown in FIG. 4.
Figure 6:
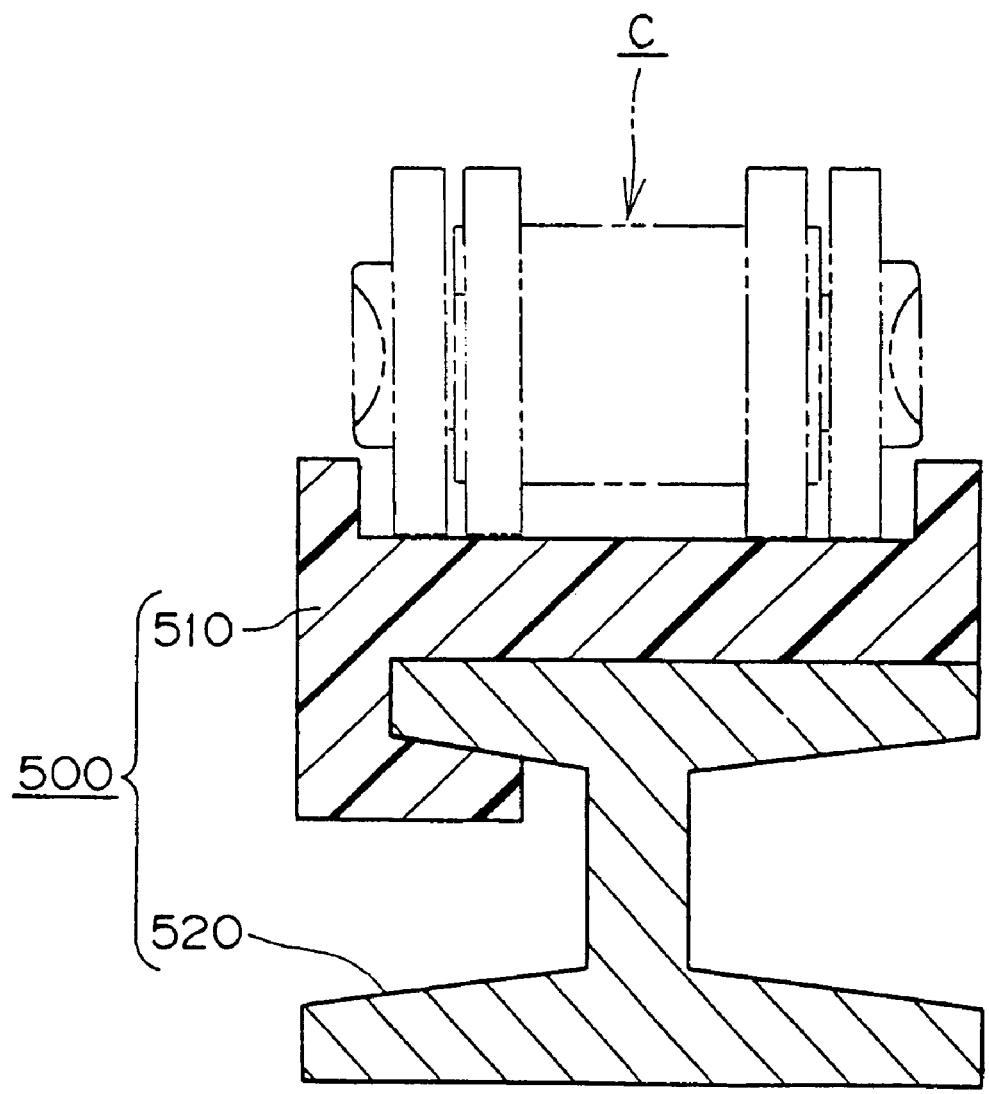
FIG. 6 is a cross-sectional view of a conventional tensioner lever.

In the modified guide 200 shown in FIGS. 4 and 5, the shoe 210 has a structure different from that of guide 100 in FIGS. 2 and 3. However, the remaining structure of guide 200 is similar to that of guide 100.

In particular, in guide 200, the side walls 211 have a stepped shape and higher than the side walls 111 of guide 100. The guide 200 has the advantage that, because of the greater height of the side walls, improper incorporation of the chain onto the guide can be easily detected by visual inspection. That is, if the chain is installed in such a way that it rides on a side wall or straddles a side wall, this condition can be easily seen and corrected. Moreover, in the operation of the guide, even though the height of the side walls is greater than the distance between the connecting pins of the chain and the chain-contacting surface of the shoe, the stepped configuration of the side walls prevents the connecting pins from contacting the side walls. The height H1 of the step of the side wall 211 is formed so that the relationship H1<P is satisfied, where P is the distance between the connecting pin of the timing chain C and the chain-contacting surface of the shoe. The width of the step is greater than the distance by which the connecting pin of the chain protrudes from the outermost link plate of the chain. The side wall height H2 is preferably such that relationship H2<L is satisfied, where L is the height of a link plate in the timing chain C. With this latter relationship, the proper incorporation of the chain onto the guide can also be detected and verified easily by visual inspection.

The guide 200, has a high strength core 210b, preferably composed of glass fiber-reinforced polyamide resin, and a skin layer 210a, preferably composed of polyamide resin, the skin layer forming both the hooks 213 and the side walls 211. The guide 200 exhibits all of the advantages of the guide 100, and, in addition, enables improper incorporation of the timing chain C to be visually observed with ease.

The invention is not limited to movable guides, and the advantages of the invention can be realized when a shoe, having a sandwich molded structure similar to that of guides 100 and 200, is incorporated onto a fixed supporting base and used as a fixed guide such as guide 300 in FIG. 1.

I claim:

1. In a chain transmission comprising an endless traveling transmission chain composed of inner and outer link plates, a guide for said chain, the guide comprising:

an elongated shoe-supporting base, adapted for mounting on an engine block, the shoe-supporting base having a front surface and a back surface, first and second ends spaced from each other in the direction of elongation of the elongated shoe-supporting base, opposite side edges extending in the direction of elongation of the elongated shoe-supporting base, and a mounting hole adjacent the first end for receiving a shaft on which the shoe-supporting base can be pivoted; and an elongated shoe having a sliding contact surface for sliding engagement with said chain, the shoe being engaged with the front surface of the shoe supporting base, and connected to and supported by, the shoe-supporting base;

the shoe having a side wall extending from said sliding contact surface in a direction such that said side wall can engage a side of the chain traveling on the sliding contact surface and thereby limit snaking travel of the chain;

the shoe also having a hook-shaped engagement portion engaged with said second end of the base, a protrusion engaged with said first end of the base, and side hooks also engageable with the shoe supporting base, each of said side hooks having a leg portion extending past a side edge of the shoe-supporting base and an inwardly extending portion engaged with said back surface of the shoe-supporting base, and said hook-shaped engagement portion, said protrusion, and said side hooks securing the shoe to the shoe-supporting base;

in which the shoe is a sandwich-molded structure having an internal core composed of resin and a skin layer also composed of resin, the resin of which the internal core is composed having a higher strength than the resin of which the skin layer is composed;

in which said side hooks include a first set consisting of a plurality of side hooks spaced longitudinally from one another along the direction of elongation of the elongated shoe-supporting base and engaged with one of said opposite side edges of the shoe supporting base, and at least one side hook engaged with the other of said opposite side edges of the shoe-supporting base, said at least one side hook being spaced longitudinally from said first end of the elongated shoe-supporting base by a distance different from the spacings of each of said side hooks of the first set from said first end, said distance being greater than the longitudinal spacing of at least one of said side hooks of the first set from said first end and less than the longitudinal spacing of at least another one of said side hooks of the first set from said first end, whereby the side hooks engaged with opposite sides of the shoe-supporting base are in longitudinally staggered relationship;

in which the side wall and side hooks are both unitary with the skin layer, and composed entirely of the resin of which the skin layer is composed;

in which said side wall comprises a low wall portion extending from said sliding contact surface by a distance less than the distance by which a connecting pin of the chain is spaced from said sliding contact surface when a pair of links connected by said pin are both in contact with said sliding contact surface;

in which the side wall also comprises a high wall portion extending to a location spaced from said sliding contact surface by a distance greater than the distance by which a connecting pin of the chain is spaced from said sliding contact surface when a pair of links connected by said pin are both engaged with said sliding contact surface, but less than the height of said chain; and in which the low and high wall portions of the side wall are in stepped relationship, the high wall portion being disposed outward from the low wall portion by a distance greater than the amount by which the connecting pins of the chain protrude from the outer link plates of the chain, whereby a clearance accommodating the connecting pins is ensured when the outer link plates of the chain are in contact with the low wall portion.

2. A guide for a transmission device according to claim 1, in which the skin layer is composed of a polyamide resin, and the core is composed of a glass fiber-reinforced polyamide resin.

\* \* \* \* \*